United States Patent [19]
Huber et al.

[11] Patent Number: 5,206,704
[45] Date of Patent: Apr. 27, 1993

[54] POSITION MEASURING APPARATUS AND METHOD OF USE THEREOF

[75] Inventors: Walter Huber; Erwin Spanner, both of Traunstein, Fed. Rep. of Germany

[73] Assignee: Dr. Johannes Heidenhain GmbH, Traunreut, Fed. Rep. of Germany

[21] Appl. No.: 663,429

[22] Filed: Mar. 1, 1991

[30] Foreign Application Priority Data

Mar. 1, 1990 [DE] Fed. Rep. of Germany ....... 4006365

[51] Int. Cl.$^5$ ............................ G01B 11/14; H01J 3/14
[52] U.S. Cl. ..................................... 356/375; 356/356; 356/358; 250/237 G
[58] Field of Search .................. 356/372-375, 356/353-356, 358, 363, 399, 400, 401; 250/237 G, 231.13, 231.14, 231.16

[56] References Cited

U.S. PATENT DOCUMENTS

| | | | |
|---|---|---|---|
| 3,738,753 | 6/1973 | Huntley, Jr. | |
| 4,600,309 | 7/1986 | Fay | 356/400 |
| 4,636,076 | 1/1987 | Pettigrew | |
| 4,676,645 | 6/1987 | Taniguchi et al. | 250/237 G |
| 4,728,193 | 3/1988 | Bartelt et al. | |
| 4,776,701 | 10/1988 | Pettigrew | |
| 4,792,678 | 12/1988 | Spies | |
| 4,815,850 | 3/1989 | Kanayama et al. | 356/356 |
| 4,938,595 | 7/1990 | Parriaux et al. | |
| 4,968,146 | 11/1990 | Heizmann et al. | 356/375 |
| 4,975,570 | 12/1990 | Nishimura et al. | 250/237 G |

FOREIGN PATENT DOCUMENTS

| | | |
|---|---|---|
| 3700906A1 | 12/1961 | Fed. Rep. of Germany |
| 2431551 | 9/1981 | Fed. Rep. of Germany |
| 3715864A1 | 11/1987 | Fed. Rep. of Germany |
| 3703203 | 3/1989 | Fed. Rep. of Germany |
| 57179811 | 4/1981 | Japan |
| 01035737 | 7/1987 | Japan |
| 88/05525 | 7/1988 | PCT Int'l Appl. |

OTHER PUBLICATIONS

Lee, *High Efficiency Multiple Beam Gratings*, Applied Optics, vol. 18, No. 13 (Jul. 1, 1979), pp. 2152-2158.

*Primary Examiner*—Samuel A. Turner
*Assistant Examiner*—Hoa Pham
*Attorney, Agent, or Firm*—Willian Brinks Olds Hofer Gilson & Lione

[57] ABSTRACT

A position measuring apparatus includes an optical instrument placed in a first plane, a first diffraction grid placed in a second plane, parallel to the first plane, a retro-reflecting element, a second diffraction grid, and an optical element, preferably placed in the first plane. The optical instrument splits a beam of light into at least two divergent partial beams which are diffracted by the first diffraction grid into parallel partial beams. The parallel partial beams are conducted through the retro-reflecting element and then impinge onto the second diffraction grid. The second diffraction grid diffracts the partial beams and causes them to interfere with each other at the optical element. A detection device measures a change ($\Delta OPD$) of path difference of the partial beams which is directly proportional to the change in distance between the first and second planes. This change ($\Delta OPD$) of the path difference can be detected by the detection device as a light-dark modulation at the optical element.

47 Claims, 4 Drawing Sheets

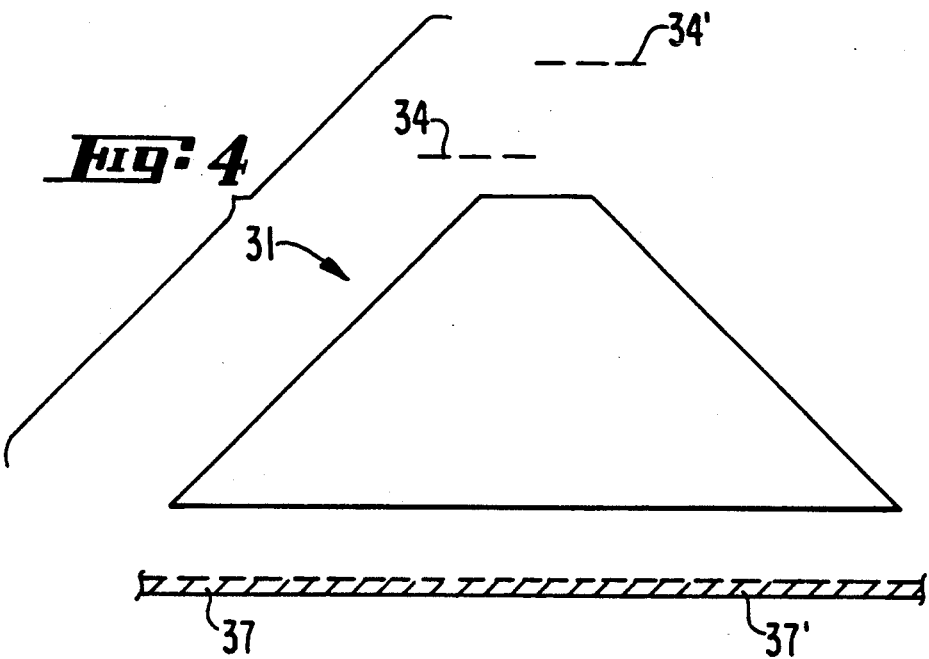
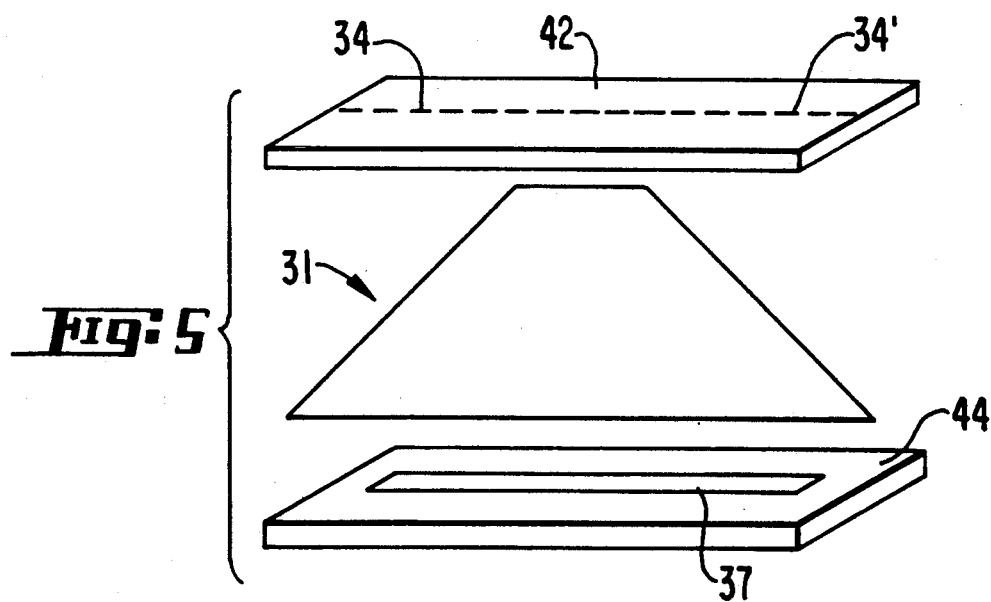

POSITION MEASURING APPARATUS AND METHOD OF USE THEREOF

BACKGROUND OF THE INVENTION

1. Field of the Invention

The present invention relates to a position measuring device, for measuring the position of two objects which are moveable in relation to each other, through the aid of diffraction of light beams by at least one diffraction grid.

2. Description of Related Art

Position measuring arrangements of this type are known, for example from German DE-A1-37 00 906. In these known position measuring arrangements a relative displacement in the direction parallel to the plane of the diffraction grid used is measured.

SUMMARY OF THE INVENTION

In contrast to the aforementioned devices of prior art, it is an object of the invention to provide a position measuring device which measures relative movement in the perpendicular direction of at least one diffraction grid. A position measuring device of this invention has a compact construction, and it is not sensitive to tilting and/or twisting of the components of the device. In the device of this invention, translatory movements of diffraction grids which do not relate to the direction of movement which is measured produce substantially no error signals.

The apparatus of the invention can be preferably used as a distance measuring arrangement. Although a reflector is provided in the apparatus of this invention, the apparatus is not a Michelson interferometer, because, for example, it does not have a reference beam, which is a characteristic feature of interferometers. The position measuring apparatus (also referred to herein as the "position measuring arrangement") of the invention thus can be classified as falling between interferometers and interferentially operating grid sensors.

According to one embodiment of this invention, there is provided a position measuring apparatus for measuring relative position of one object, placed in one plane, with respect to a second object, placed in a second plane, parallel to the first plane. The apparatus comprises an illumination and a detection arrangement for measuring the position of two objects, which are movable in relation to each other, with the aid of the diffraction of light beams at at least one grid division, in which a beam of light emitted by the illumination arrangement is split at a first plane by at least one optical instrument into partial beams which extend in different directions. In the second plane, there is provided a first diffraction grid, which diffracts the partial beams in such a manner that the partial beams are oriented parallel to each other. The partial beams then penetrate a retro-reflecting element, while parallel orientation of the partial beams to each other is maintained. Upon exiting the retro-reflecting element, the parallel partial beams impinge on a second diffraction grid. The second diffraction grid diffracts the partial beams and directs them to an optical element at the first plane, wherein they are brought to an interference with each other. When the first plane moves with respect to the second plane, such that there is a change ($\Delta s$) in a distance between the first plane and the second plane, a change in optical path difference ($\Delta OPD$) of the partial beams occurs. The change in the optical path difference, directly proportional to the change in the distance $\Delta s$, is detected by the detection arrangement as a light-dark modulation. The detection arrangement is preferably placed beneath the optical element.

In another embodiment, the invention comprises an illuminating device, emitting a light beam, and an optical instrument located downstream from the illuminating device that splits the light beam at a first plane into at least two divergent partial beams. The divergent partial beams are then diffracted in a second plane, parallel to the first plane, by a first diffraction grid which is positioned downstream from the optical device. The partial beams are diffracted by the first diffraction grid in such a manner that they are oriented parallel to each other. The parallel partial beams then penetrate a retro-reflecting element while parallel orientation of the partial beams is maintained. Upon exiting the retro-reflecting element, the partial beams impinge on a second diffraction grid. The second diffraction grid diffracts the parallel partial beams and directs them to an optical element wherein the partial beams are brought to an interference. The optical element is preferably positioned in the first plane.

When there is a change in the distance ($\Delta s$) between the first and the second planes, a change in the optical path difference ($\Delta OPD$) of the partial beams occurs which is directly proportional to the change in distance ($\Delta s$) and which is detected by a detection apparatus as a light-dark modulation. The detection apparatus is preferably placed beneath the optical element.

In yet another embodiment, the invention comprises a method of measuring position of a first object with respect to a second object. The method comprises the steps discussed below. Initially, the first object is placed on a first support, comprising an optical instrument, and the second object is placed on a second support, comprising a first diffraction grid. The optical instrument is illuminated with a light beam emitted by an illumination device. The light beam is split by the optical instrument in a first plane into at least two divergent partial beams. The first diffraction grid receives the partial beams and diffracts them in a second plane, parallel to the first plane, in such a manner that the partial beams are parallel to each other. The partial beams are then conducted to a retro-reflecting element and passed through the retro-reflecting element in such a manner that the partial beams remain parallel to each other. The partial beams are subsequently conducted to a second diffraction grid, which diffracts the partial beams. The partial beams diffracted by the second diffraction grid are conducted to an optical element which brings the partial beams to an interference. A detection device measures light-dark modulation on the optical element. The light-dark modulation is indicative of a change in optical path difference ($\Delta OPD$) of the partial beams, which is directly proportional to a change in distance ($\Delta s$) between the first plane and the second plane. Relative distance (position) of the first object with respect to the second object can thus be determined.

One advantage of the invention is that a relative position measuring device having relatively small dimensions is provided. Another advantage of the invention is that the relative position measuring device is provided which is substantially not sensitive to a large degree of tilting and/or twisting of its components. A further advantage is that translatory movements of diffraction grids, spaced with respect to each other, which do not relate to the direction of movement which is measured produce substantially no error signals.

The invention itself, together with further objects and attendant advantages, will best be understood by reference to the following detailed description, taken in conjunction with the accompanying drawings. It should be understood, however, that this description is intended to be illustrative rather than limiting, the scope of the present invention being defined by the appended claims and equivalents thereof.

BRIEF DESCRIPTION OF THE DRAWINGS

FIG. 4 is a schematic representation of the embodiment of FIG. 3 wherein the optical instrument is vertically displaced with respect to the optical element.

FIG. 5 is a schematic representation of the embodiment of FIG. 3 wherein a first support comprises an optical instrument and a second support comprises a first diffraction grid.

DETAILED DESCRIPTION OF THE PREFERRED EMBODIMENTS

Figure 1A:
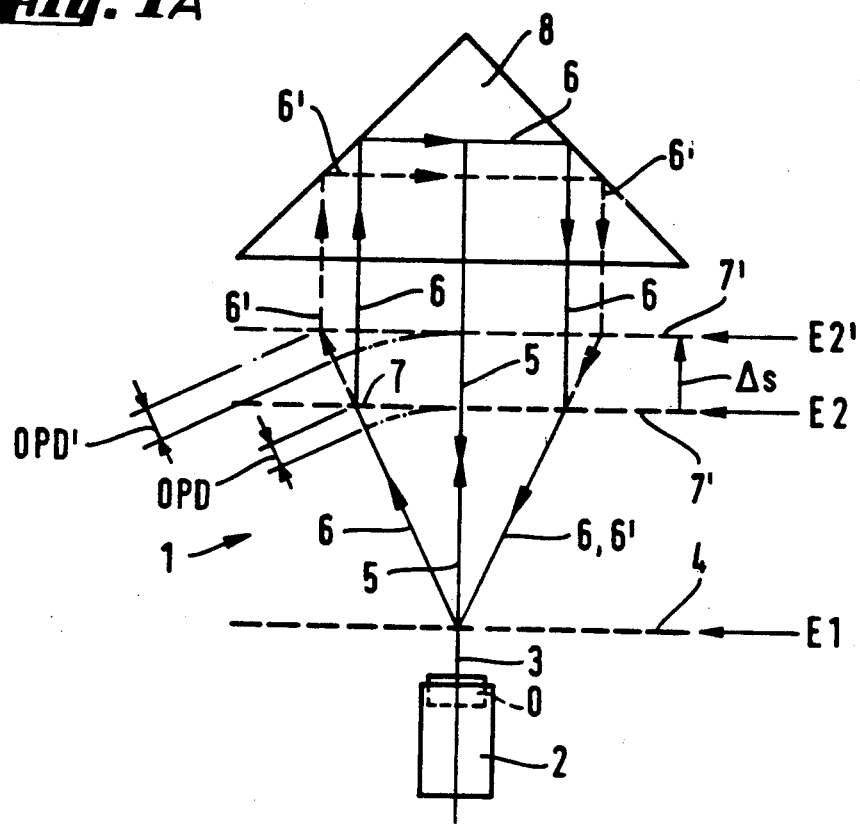
FIG. 1A shows a distance sensor having one diffraction grid comprising an optical instrument and a separate diffraction grid comprising an optical element.

Turning now to the drawings, FIG. 1A shows a distance sensor 1 (also referred to herein as a "position measuring arrangement" or a "position measuring apparatus") comprising a laser 2, as an illumination device (also referred to herein as an "illumination arrangement"). The laser 2 emits a light beam 3 onto an optical instrument 4 located in a first plane E1. The optical instrument 4 is, for example, a diffraction grid, preferably a phase grid. If the optical instrument 4 is a diffraction grid, it is referred to herein as a "diffraction grid of the optical instrument". It is also possible to utilize any other suitable optical instruments for splitting the light beam 3. The light beam 3 is split by the optical instrument 4 into two partial beams 5 and 6, which extend in different directions. The partial beams 5 and 6 are directed to a first diffraction grid 7, located in a second plane E2 parallel to the plane E1. The first diffraction grid 7 diffracts the partial beams 5 and 6 in such a manner that they are parallel to each other. The partial beams enter a retro-reflecting element 8, penetrate it as parallel beams, and impinge, still as parallel beams, on a second diffraction grid 7' in the plane E2. A suitable retro-reflecting element is a 90° prism, preferably a triple prism. The second diffraction grid 7' diffracts the partial beams in such a manner that they come to interference at an optical element 4' (FIG. 1B) in the plane E1. The optical element is, for example, a diffraction grid. The partial beams 5 and 6 move in optical paths of different lengths from the time of splitting of the light beam 3 to the time of the interference of the partial beams at the optical element 4'. This is called the path difference OPD, an abbreviation of the internationally used term "Optical Path Difference", also abbreviated as ΔOPD.

If the distance between the optical instrument 4 and the first diffraction grid 7 in the planes E1 and E2 changes, the path difference OPD of the partial beams 5 and 6 also changes. Thus, if the planes E1 and E2 come closer to each other, the path difference OPD becomes smaller. Conversely, if the distance between the planes E1 and E2 increases, the path difference OPD also increases.

An example is illustrated in FIG. 1A wherein the second diffraction grid 7' is shown in a plane E2' at a distance Δs from the former plane E2. When the second diffraction grid 7' is in the plane E2, it produces two partial beams 5 and 6. When the second diffraction grid 7' is in the plane E2', it produces two partial beams 5 and 6'. The partial beam 6' traverses a longer optical path than the partial beam 6, while there are no changes in the length of the optical path of the partial beam 5. This is indicated by the course of the partial beam path 6' shown in dotted lines.

A relative vertical movement of the optical instrument 4 with respect to the first diffraction grid 7 or the second diffraction grid 7' results in path difference change ΔOPD of the partial beams 5 and 6, which is proportional to the distance change Δs. This can be detected as a light-dark modulation by a suitable detection arrangement. In the embodiment of FIG. 1A, the detection arrangement 0 is spatially located behind the laser 2.

Figure 1B:
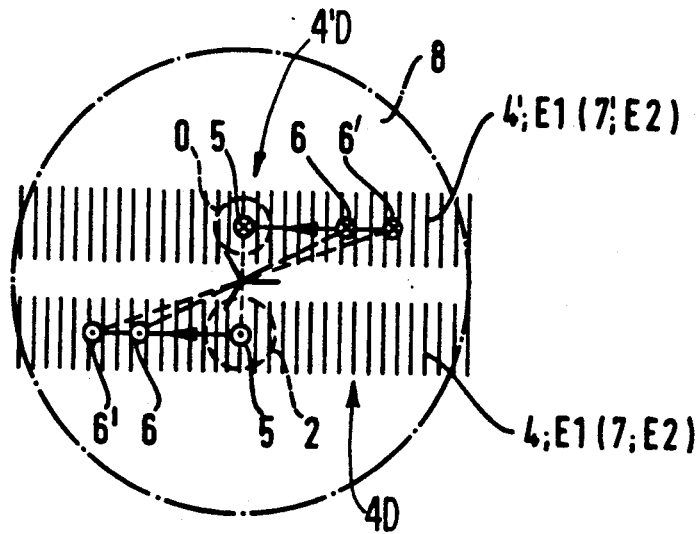
FIG. 1B is a top view of the device of FIG. 1A.

A schematic top view of the embodiment of FIG. 1A is shown in FIG. 1B. As indicated in FIG. 1B, the optical instrument 4 is separate and distinct from the optical element 4'. In FIG. 1B, the optical instrument 4 comprises a diffraction grid 4D, while the optical element 4' comprises a separate diffraction grid 4'D. The diffraction grids 4D and 4'D are located in the same plane E1. The diffraction grids 4D and 4'D are spaced from each other. The diffraction grid 4D splits the light beam 3 into two partial beams 5 and 6. The diffraction grid 4'D receives the partial beams 5 and 6 which come to interference at the diffraction grid 4'D. A detection device 0 detects a light-dark modulation in the diffraction grid 4'D. The modulation is correlated to the change in path difference ΔOPD, which is directly proportional to the change in distance Δs.

It is also possible to locate the optical instrument, such as the diffraction grid 4D, and the optical element, such as the diffraction grid 4'D, in two different planes, so that the optical instrument is vertically spaced with respect to the optical element.

In the embodiment of FIGS. 1A and 1B, the first diffraction grid 7 is also separate from the second diffraction grid 7'. The first diffraction grid 7 and the second diffraction grid 7' are each in the same plane E2 (FIG. 1B). It is also possible to locate the first diffraction grid 7 and the second diffraction grid 7' in two different planes, so that the first diffraction grid 7 is vertically spaced with respect to the second diffraction grid 7'.

It is also possible to split each or any combination of the optical instrument, the optical element, the first diffraction grid 7 and the second diffraction grid 7' into two or more optical devices which may be placed in the same plane or in different planes. Such modifications would have to be taken into consideration in the layout of the optical instrument, the optical element and the diffraction grids 7 and 7'.

Figure 2A:
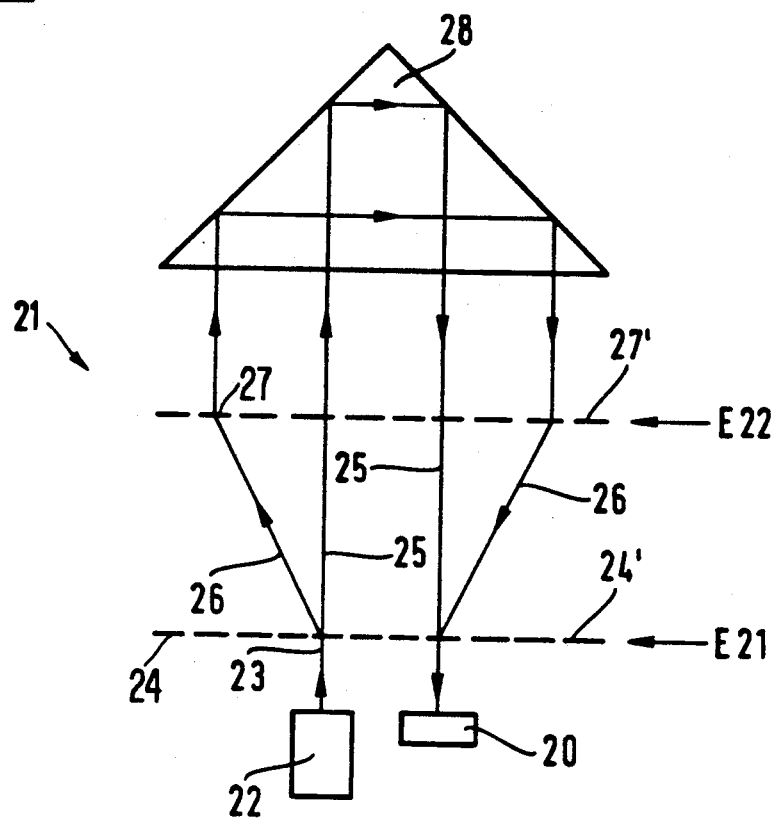
FIG. 2A shows a distance sensor having a single diffraction grid which comprises an optical instrument and an optical element.
Figure 2B:
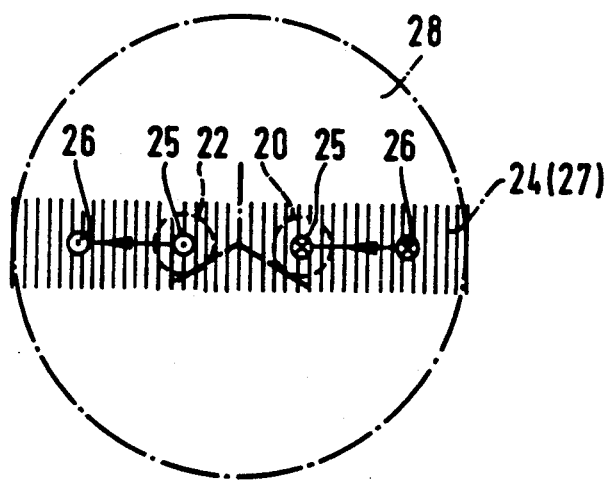
FIG. 2B is a top view of the device of FIG. 2A.

It is also possible to use a single diffraction grid to perform the functions of the first and the second diffraction grids. Similarly, it is possible to use a single optical device, such as a single diffraction grid or a single phase grid, to perform the functions of the optical instrument and the optical element, as illustrated in the embodiments of FIGS. 2A and 2B. These figures illustrate a variation of the distance sensor of FIGS. 1A and 1B, identified by the reference numeral 21 in FIGS. 2A and 2B.

A laser 22, used as an illumination device or arrangement, emits a light beam 23 onto an optical instrument 24 which comprises a diffraction grid ("diffraction grid of the optical instrument"), where the partial beams 25 and 26 are generated. The partial beams 25 and 26 are directed to a first diffraction grid 27, which is located at a parallel distance from the diffraction grid of the optical instrument 24. Two parallel planes E21 and E22 are defined by the optical instrument diffraction grid 24 and the first diffraction grid 27. The two planes are separated by a set distance from each other.

The partial beams 25 and 26 are aligned parallel to each other by diffraction at the first diffraction grid 27. The partial beams then enter and are conducted through a retro-reflecting element 28 (such as a triple prism), placed downstream of the first diffraction grid 27. The partial beams are maintained in parallel relation to each other while they are in the retro-reflecting element. The partial beams then impinge on a second diffraction grid 27', which directs them to an optical element 24' in such a manner that they are brought to an interference at the optical element 24'. The optical element 24' suitably comprises a diffraction grid.

A detection device 20 detects the light-dark modulation occurring in the partial beams 25 and 26 because of changes in the path difference, as explained above in connection with the embodiment of FIGS. 1A and 1B.

As shown in FIG. 2B, a single optical device, such as a single diffraction grid 24, can be used in this invention to perform the functions of the optical instrument and the optical element. Thus, if no parallel offset between the optical instrument and the optical element is required or desired for illumination and detection, the retro-reflecting element 28 can be reduced to a 90° prism, which does have retro-reflecting properties in one plane, but which is not shown herein.

Figure 3:
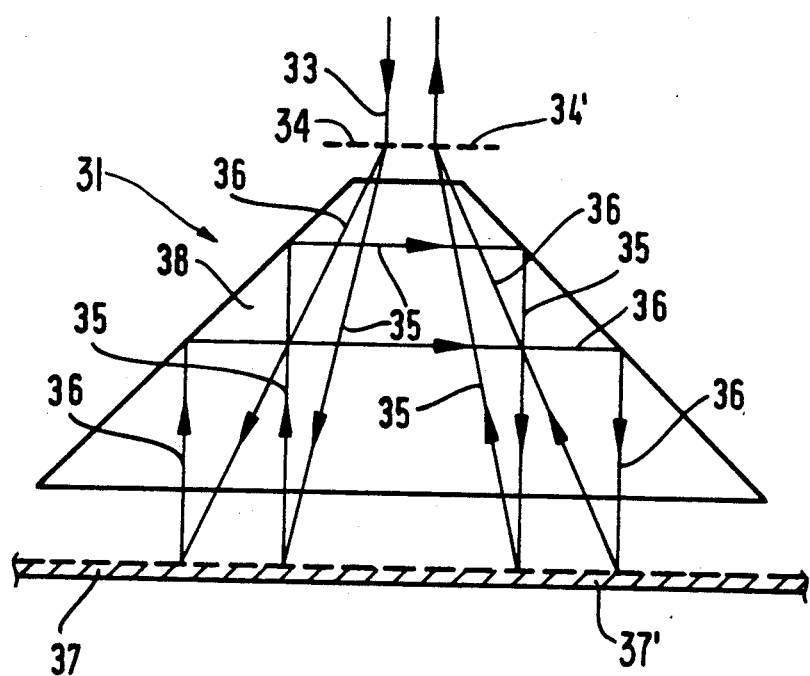
FIG. 3 is an embodiment of the invention utilizing incident light.

As a variation on the embodiments described above, the invention can also be utilized with incident light devices, which may require a changed geometrical arrangement of the components of the invention, but which would not depart from the scope of the invention. An example of such a variation is shown schematically in FIG. 3. In FIG. 3, components corresponding to those of FIGS. 1A and 1B are designated by the same numerals as in FIGS. 1A and 1B, preceded by a prefix of "3". For example, a retro-reflecting element 38 of FIG. 3 corresponds to the retro-reflecting element 8 of FIGS. 1A and 1B.

A light beam 33, produced by a light source, not shown, is split by an optical instrument 34, such as a diffraction grid, into partial beams 35 and 36, which extend in different directions.

A special component of this exemplary embodiment is a triple prism 38, which serves as a retro-reflecting element, located between the optical instrument 34 and a first diffraction grid 37. The tip of this triple prism 38 has been removed. Accordingly, the partial beams 35 and 36 enter at the surface opposite the base of the prism, which was created by the removal of the tip, instead of entering at the base, as is customary.

Without considering different diffraction indices, which can be disregarded in this as well as in the other exemplary embodiments of this invention, the partial beams 35 and 36 penetrate unaltered the triple prism from the back and impinge on a first diffraction grid 37, which in this embodiment has been designed as a reflection grid. The partial beams 35 and 36 are aligned parallel to each other by diffraction of this reflection grid 37 and then enter, in the manner similar to that described in connection with the embodiments of FIGS. 1A, 1B, 2A and 2B, the triple prism 38 from the base. The partial beams penetrate the triple prism 38 and are reflected off the walls of the prism, as shown in FIG. 3. While the partial beams 35, 36 are within the prism 38, the partial beams are maintained in parallel relation to each other. The parallel partial beams 35, 36 exit the prism 38 and impinge on the second diffraction grid 37', which is a reflection grid. The partial beams are again diffracted at the second diffraction grid 37' and reflected by the surface of the second diffraction grid 37' through the prism 38 onto an optical element 34' which comprises a diffraction grid. The partial beams come to interference at the optical element 34' and the light-dark modulation can be detected.

In the embodiment of FIG. 3, as in all other embodiments of the invention, changes in the distance between the optical instrument 34 and the first diffraction grid 37 lead to proportional changes in the phase difference (which are indicative of a change in optical path difference, $\Delta OPD$) of the interfering partial beams 35 and 36, the light-dark modulation of which, provides the distance measurement signal.

FIG. 5 schematically illustrates the embodiment of FIG. 3 wherein a first support 42 supports the optical instrument 34 and a second support 44 supports the first diffraction grid 37.

The desired signal period is set in all embodiments of the invention by suitable selection of the length of light waves and/or the diffraction grid constants. Phase-shifted signals are generated in a known manner, e.g., by means of polarization optics or by a suitable layout of the optical instrument comprising a phase grid.

The invention may be used both with intentionally-generated light beams and with incidental light. Accordingly, the term "light beam" as used herein includes such intentionally-generated light beams and light beams produced by incidental light.

In all embodiments of the invention, the optical instruments and optical elements may be comprised of any suitable optical devices, such as diffraction grids (or gratings), preferably phase grids. Diffraction grids in all embodiments of the invention may also be comprised of any suitable optical devices, such as reflection grids if desired for a particular application.

A suitable retro-reflecting element which can be used in all embodiments of the invention is any one of the optical devices known as "trihedral retro-reflectors", such as a triple prism, cat's eye, spherical retro-reflector, triple mirror or corner reflector.

In all embodiments of the invention, it is possible to locate the optical instrument in a different vertical plane than the optical element, so that the optical instrument is vertically spaced with respect to the optical element, as illustrated schematically in FIG. 4 for the embodiment of FIG. 3. In such a modification, it is preferred that the optical instrument be parallel to the optical element.

In all embodiments of the invention, it is also possible to locate the first diffraction grid in a different vertical plane than the second diffraction grid, so that the first diffraction grid is vertically spaced with respect to the second diffraction grid. In such a modification, it is preferred that the first diffraction grid be parallel to the second diffraction grid.

It is to be understood that a wide range of changes and modifications can be made to the embodiments described above. It is therefore intended that the foregoing detailed description be regarded as illustrative rather than limiting, and that it be understood that it is the following claims including all equivalents which are intended to define the spirit and scope of this invention.

What is claimed is:

1. A position measuring arrangement having an illumination arrangement emitting a light beam and a detection arrangement for measuring the position of two objects, which are movable in relation to each other, with the aid of diffraction of the light beam at at least one grid division, in which the light beam is split at a first plane by means of at least one optical instrument into partial beams which extend in different directions, an improvement comprising:

in a second plane, parallel to the first plane, a first diffraction grid is provided, at which the partial beams are diffracted in such a manner that the partial beams are oriented parallel to each other;

the partial beams penetrate a retro-reflecting element in the form of parallel partial beams and the parallel partial beams impinge on a second diffraction grid to be again diffracted and to be subsequently directed to an optical element at the first plane wherein the partial beams are brought to an interference at the optical element, such that, if there is a change ($\Delta s$) in a distance between the first plane and the second plane, a change in the optical path difference ($\Delta OPD$) of the partial beams occurs which is directly proportional to the change in the distance $\Delta s$, and which is detected by the detection arrangement as a light-dark modulation.

2. The position measuring arrangement in accordance with claim 1, wherein the optical instrument comprises a diffraction grid.

3. The position measuring arrangement in accordance with claim 2, wherein each of the first diffraction grid, the second diffraction grid and the diffraction grid of the optical instrument is made of several pieces.

4. The position measuring arrangement in accordance with claim 1, wherein the optical instrument comprises a phase grid.

5. The position measuring arrangement in accordance with claim 4, wherein each of the phase grid, the first diffraction grid and the second diffraction grid is made of several pieces.

6. The position measuring arrangement in accordance with claim 1, wherein the retro-reflecting element comprises a 90° prism.

7. The position measuring arrangement in accordance with claim 1, wherein the retro-reflecting element comprises a triple prism.

8. The position measuring arrangement in accordance with claim 7, wherein the triple prism is placed downstream of the optical instrument and the first diffraction grid.

9. The position measuring arrangement in accordance with claim 7, wherein the triple prism is disposed between the optical instrument and the first diffraction grid.

10. The position measuring arrangement in accordance with claim 9, wherein the tip of the triple prism has been removed.

11. The position measuring arrangement in accordance with claim 9, wherein the first diffraction grid comprises a reflecting grid.

12. The position measuring arrangement in accordance with claim 1, wherein each of the first and second diffraction grids comprises several pieces.

13. The position measuring arrangement of claim 1 wherein the position of the two objects is measured in a direction perpendicular to the first diffraction grid.

14. A position measuring apparatus comprising
an illumination device emitting a light beam;
an optical instrument located downstream from the illumination device that splits the light beam at a first plane into at least two divergent partial beams;
a first diffraction grid placed in a second plane, parallel to the first plane, downstream from the optical instrument, the first diffraction grid diffracting the partial beams in such a manner that they are oriented parallel to each other;
a retro-reflecting element receiving the partial beams and maintaining them parallel to each other;
a second diffraction grid receiving the partial beams from the retro-reflecting element and diffracting the partial beams;
an optical element receiving the partial beams from the second diffraction grid and bringing the partial beams to an interference;
a detection device detecting the partial beams in the optical element, thereby measuring a change in the optical path difference ($\Delta OPD$) of the partial beams which is directly proportional to a change in distance ($\Delta s$) between the first plane and the second plane.

15. The position measuring apparatus of claim 14, wherein the optical element detects the $\Delta OPD$ as a light-dark modulation.

16. The position measuring apparatus of claim 14, wherein the optical instrument comprises a diffraction grid ("diffraction grid of the optical instrument").

17. The position measuring apparatus of claim 16, wherein the diffraction grid of the optical instrument comprises a phase grid.

18. The position measuring apparatus of claim 14, wherein the retro-reflecting element comprises a 90° prism.

19. The position measuring apparatus of claim 18, wherein the 90° prism is a triple prism.

20. The position measuring apparatus of claim 19, wherein the triple prism is placed downstream of the optical instrument and the first diffraction grid.

21. The position measuring apparatus of claim 19, wherein the triple prism is placed between the optical instrument and the first diffraction grid.

22. The position measuring apparatus of claim 19, wherein the tip of the triple prism has been removed.

23. The position measuring apparatus of claim 14, wherein the first diffraction grid is in the form of a reflecting grid.

24. The position measuring apparatus of claim 14, wherein the second diffraction grid is in the form of a reflecting grid.

25. The position measuring apparatus of claim 14, wherein a single diffraction grid comprises both the optical instrument and the optical element.

26. The position measuring apparatus of claim 14, wherein a single diffraction grid comprises both the first and the second diffraction grids.

27. The position measuring apparatus of claim 13, wherein the optical instrument and the optical element are placed parallel each other in the first plane.

28. The position measuring apparatus of claim 14, wherein the first and the second diffraction grids are placed parallel to each other in the second plane.

29. The position measuring apparatus of claim 14, wherein the optical instrument is vertically displaced with respect to the optical element and the optical instrument is placed in a plane parallel to the plane of the optical element.

30. The position measuring apparatus of claim 14, wherein the first diffraction grid is vertically displaced with respect to the second diffraction grid and the first diffraction grid is placed in a plane parallel to the plane of the second diffraction grid.

31. The position measuring apparatus of claim 14 wherein the Δs is measured in a direction perpendicular to the first diffraction grid.

32. A method of measuring position of a first object with respect to a second object, comprising:
   placing the first object on a first support, comprising an optical instrument;
   placing the second object on a second support, comprising a first diffraction grid;
   illuminating the optical instrument with a light beam;
   splitting the light beam by the optical instrument in a first plane into at least two divergent partial beams;
   causing the first diffraction grid to receive and diffract the partial beams in a second plane, parallel to the first plane, so that the partial beams are parallel to each other;
   conducting the partial beams to a retro-reflecting element which causes the partial beams to pass through the retro-reflecting element and which maintains the partial beams parallel to each other within the retro-reflecting element;
   conducting the partial beams to a second diffraction grid which diffracts the partial beams;
   conducting the partial beams to an optical element which brings the partial beams to an interference; and
   measuring with a detection device a change in the optical path difference (ΔOPD) of the partial beams which is directly proportional to a change in distance (Δs) between the first plane and the second plane.

33. The method of claim 32, wherein the optical instrument comprises a diffraction grid ("diffraction grid of the optical instrument").

34. The method of claim 32, wherein the retro-reflecting element comprises a 90° prism.

35. The method of claim 34, wherein the 90° prism is a triple prism.

36. The method of claim 35, wherein the triple prism is placed downstream of the optical instrument and the first diffraction grid.

37. The method of claim 35, wherein the triple prism is placed between the optical instrument and the first diffraction grid.

38. The method of claim 32, wherein the first diffraction grid is in the form of a reflecting grid.

39. The method of claim 32, wherein the second diffraction grid is in the form of a reflecting grid.

40. The method of claim 32, wherein a single diffraction grid comprises both the optical instrument and the optical element.

41. The method of claim 32, wherein a single diffraction grid comprises both the first and the second diffraction grids.

42. The method of claim 32, wherein the optical instrument and the optical element are placed parallel to each other in the first plane.

43. The method of claim 32, wherein the first and the second diffraction grids are placed parallel to each other in the second plane.

44. The method of claim 32, wherein the optical instrument is vertically displaced with respect to the optical element and the optical instrument is placed in a plane parallel to the plane of the optical element.

45. The method of claim 32, wherein the first diffraction grid is vertically displaced with respect to the second diffraction grid and the first diffraction grid is placed in a plane parallel to the plane of the second diffraction grid.

46. The method of claim 32 wherein the Δs is measured in a direction perpendicular to the first diffraction grid.

47. In a position measuring arrangement comprising an illumination arrangement and a detection arrangement for measuring the relative position of two objects, movable relatively to one another, with the aid of light-beam diffraction on at least one grid division, in which by means of at least one optical instrument an illumination beam is split at a first plane into partial beam bundles which extend in different directions, the relative position being measured in a direction perpendicular to the grid division, characterized in that:
   in a second plane, that lies parallel to the first plane, there is provided a first diffraction grid on which the partial beam bundles are diffracted in such a way that they are aligned parallel to each other;
   the resulting parallel partial beam bundles pass through a retro-reflecting element and impinge upon the first diffraction grid, in order to be again diffracted and fed to an optical element in the first plane where they come into interference, such that if there is a spacing change (Δs) in a distance between the first plane and the second plane, of the interfering partial beam bundles, there occurs a change in the optical path difference (ΔOPD) which is directly proportional to the spacing change and which is detected by the detection arrangement as a light-dark modulation.

* * * * *